2,903,488

CHEMICAL METHOD AND COMPOSITION

Norman L. Beckers, Houston, Tex., assignor to Diamond Alkali Company, Cleveland, Ohio, a corporation of Delaware No Drawing. Application January 18, 1956
Serial No. 559,779

6 Claims. (Cl. 260—652.5)

This invention relates to the stabilization of chlorinated hydrocarbons, particularly low molecular weight chlorinated hydrocarbons, such as ethylene dichloride, ethylene trichloride and tetrachloroethane, against decomposition under the influence of decomposing factors such as heat, moisture, light, air and particularly metal surfaces. The invention is concerned especially with preventing decomposition of ethylene dichloride as brought about by the effects of metal surfaces. For convenience in describing the invention, reference will be made hereinafter only to ethylene dichloride; however, it is to be understood that in so doing other similar chlorohydrocarbons are thereby envisaged and that the invention is not limited to the stabilization of ethylene dichloride or compositions of matter comprising only ethylene dichloride as the material to be stabilized.

It has long been known that the lower molecular weight chlorohydrocarbons of a high degree of purity are relatively inert to the action of air, light, heat, moisture and metal surfaces with which they come into contact during storage and commercial use. However, the obtaining of such high purity chlorohydrocarbons in commercial production is not generally feasible and it has been found that the impure materials normally encountered in commercial operations decompose when exposed to the influences noted above. Hence, means other than purification, for preventing or inhibiting the decomposition of such chlorinated hydrocarbons are necessary. Ethylene dichloride is no exception to this general statement; on the contrary, ethylene dichloride may, under particular conditions, be more susceptible to deterioration than other individuals of the same general group.

One of the principal difficulties occurring in the use of ethylene dichloride appears to be metal catalyzed decomposition with resulting release of hydrogen chloride. This decomposition appears to be accelerated in the presence of moisture, heat, and/or light. Once decomposition begins, various undesirable impurities other than hydrogen chloride arise due to decomposition of unsaturated materials which result from the initial decomposition. These unsaturated materials undergo oxidation, particularly at the double bond, leading to, among other things, the formation of chloroacetic acid. Further, it appears that decomposition is catalyzed by the products of oxidation, as a result of which, oxidative decomposition once initiated is self-catalyzing and self-sustaining. Principal among the difficulties, however, with which the present invention is concerned is the metal catalyzed decomposition with ensuing corrosion of the metal.

As noted above, crude lower aliphatic chlorohydrocarbons are seldom pure materials. For example, commercially produced ethylene dichloride contains small amounts of other chlorinated hydrocarbons, both saturated and unsaturated, including such as dichloroethylene, trichloroethylene, and similar saturated chlorohydrocarbons. All of these lower chlorohydrocarbons are relatively innocuous in many processes of use of ethylene dichloride; however, the oxidation and decomposition products of the ethylene dichloride and the impurities therein corrode metal surfaces with which a body of ethylene dichloride containing them comes into contact. The degree of corrosion, of course, is directly related to the time of contact and where it is necessary to store ethylene dichloride over a long period of time and where metal containers are used, as is commonly done, the problem becomes acute due to the serious damage done to the container by the decomposition products mentioned above. The material is stored generally and oftentimes shipped in steel containers. Storage tanks themselves may be in continuous use for a period of years and are subject to the cumulative effects of such storage. Since the corrosive action is rapid, considerable damage is wrought in a matter of months.

Additionally, where the solvent comes into contact with materials intended to remain bright and to give the appearance of an untarnished surface, ethylene dichloride containing substantial amounts of decomposition products rapidly effects discoloration of such surfaces.

The problem therefore is principally one of inhibiting initial decomposition of ethylene dichloride to hydrogen chloride and unsaturated materials, inhibiting the oxidation of these unsaturates and of other chlorohydrocarbons commonly associated with ethylene dichloride.

As is well known, the problem of stabilizing lower aliphatic chlorinated hydrocarbons has received the attention of skilled artisans for a very long time in the course of which it has become increasingly apparent that it is extremely unrewarding to apply the teachings respecting the stabilization of the particular chlorohydrocarbons to the problem presented by another similar chlorohydrocarbon. To a great extent, perhaps as much as in any other field of organic chemistry, such teachings are inapplicable, especially as to practical situations involving commercial problems beyond a particular environment.

Stabilization of ethylene dichloride has received no little attention in the past, although perhaps not nearly as much as unsaturated similar materials. So far as is known, no stabilizer has been taught heretofore which affords the advantages of the stabilizer of the present invention. Furthermore, in contrast to many known similar stabilized systems, the present invention employs a remarkably small amount of the stabilizing agent while achieving results entirely comparable.

Accordingly, the primary object of this invention is to provide means for inhibiting the decomposition of lower aliphatic chlorohydrocarbons, particularly ethylene dichloride, with the release of hydrogen chloride, and the oxidation of low molecular weight chlorohydrocarbons, especially those commonly associated with ethylene dichloride, during exposure to light, air, heat, moisture and especially metal surfaces.

This and other objects will be apparent to those skilled in the art from the discussion hereinafter.

It has now been found according to this invention that where the crude ethylene dichloride, particularly that obtained from commercial processes involving the chlorinolysis of lower hydrocarbons or hydrocarbon chlorides, or of unsaturated hydrocarbons, such as acetylene, ethylene, ethane and the like contains appreciable amounts of lower chlorinated aliphatic hydrocarbons other than ethylene dichloride as impurities, such as crude product may initially be treated with an aqueous solution of an inorganic base and a high boiling point organic base in order to destroy the major portion of volatile acids and acid-forming impurities and then combined with di-isopropylamine, whereby decomposition of the ethylene dichloride and other lower chlorinated aliphatic hydrocarbons is inhibited for long periods of time under very adverse conditions of storage and commercial use.

Further, it has been found that crude ethylene dichloride which has not been so neutralized with the above-mentioned basic materials also may be stabilized satisfactorily against decomposition. In this latter instance, the impurities normally resulting in the crude product as a result of the process of its manufacture are present and, depending upon the amount of impurities contained, undesirable effects under conditions of storage and use may take place. However, initial impurities unless in very high percentage are secondary in their damaging effects as compared with those produced under conditions of storage and use under the catalytic effects as mentioned herein.

Alternatively, crude ethylene dichloride and chlorohydrocarbons may be subjected to a stripping operation wherein a major portion of the most damaging impurities are removed. In this operation, well known to those skilled in the art, material is subjected to distillation under conditions calculated to remove the lighter ends present (including hydrogen chloride) in the compound.

In either of the above last mentioned conditions, such crude unneutralized ethylene dichloride may be stabilized with di-isopropylamine with advantageous results; however, as those skilled in the art will appreciate, preferably the crude material is pretreated at least to the extent that residual hydrogen chloride is not present in substantial amounts.

In general, therefore, the present invention is directed to a composition comprising a lower aliphatic chlorinated hydrocarbon, especially ethylene dichloride, and stabilizing amounts of di-isopropylamine.

According to the invention, surprisingly small amounts of di-isopropylamine are required to serve the purposes of this invention. Depending upon the severity of conditions of use or the duration of time that a particular batch of stabilized material may be exposed to catalyzing effects, particularly metal catalyzing effects, such as storage in steel containers, stabilizing effects of di-isoproplyene are provided by as little as 0.005 percent by weight of ethylene dichloride. Even where the conditions of use or storage are prolonged and severe, it is found that excellent protection against damaging effects of decomposition is provided by as little as 0.05 percent by weight of the ethylene dichloride. Thus, within the invention, lower aliphatic chlorinated hydrocarbons, particularly ethylene dichloride, may be stabilized by the use of di-isopropylamine in quantity within the range of about 0.005 percent to about 0.05 or more percent by weight of the material to be stabilized.

The initial treatment of the crude ethylene dichloride, mentioned above, may include adding an organic base of the amine type and having a boiling point higher than ethylene dichloride, for example, aniline or morpholine, in an amount from approximately 0.2–2.0 percent by weight to the crude product, and fractionally distilling the crude mass to recover substantially all of the ethylene dichloride as an intermediate fraction in the distillation; additional treatments may include washing the ethylene dichloride fraction with a solution of an inorganic base, such as an alkali metal or alkaline earth metal base, for example, sodium hydroxide, sodium carbonate, calcium hydroxide, magnesium bicarbonate, and the like, drying the washed product and distilling the dried product to recover a more highly refined ethylene dichloride fraction.

The purpose in using an amine, such as aniline, is to allow for the reaction of such amine with acid chloride products contained in the crude product, whereby an anilide or analogous compound may form during distillation and the undesired impurity is retained in the distillation residue. The purpose of washing the effluent from the initial distillation with an alkali metal or alkaline earth metal base is to remove the more volatile of the acid chloride impurities, such as hydrogen chloride, phosgene, and the like, which may not have reacted with the amine.

The crude product may also be washed initially with a solution of an inorganic base, such as those noted above, dried, and combined with an amine having a boiling point substantially higher than ethylene dichloride generally in an amount from 0.2–2.0 percent by weight, and the mixture thus obtained distilled as described above in order to recover the purified ethylene dichloride substantially free from chloro-oxygen-containing impurities.

Where such impurities as hydrogen chloride, phosgene, chloro-acids, and the like, are known to be extremely low in the crude product, this material may be combined with an amine, such as aniline, as noted hereinabove, and subjected to fractional distillation to recover the substantially pure ethylene dichloride without the necessity of resorting to the treatment with a solution of an inorganic base. Moreover, the dilute alkaline wash may be omitted even where the chloro-oxygen-containing compounds are present in appreciable quantities in the crude product, but it has been found that the amount of organic amine consumed and the volume of distillation residue accumulated are excessive.

After any one of the above-described initial treatments, the recovered ethylene dichloride may be combined with a stabilizing amount of di-isopropylamine, noted above, for example, in an amount from 0.005–0.10 or more percent by weight of ethylene dichloride, preferably, however, from 0.10–0.05 percent where the above pretreatments or their equivalent have been used.

No special procedure is necessary for preparing the stabilized compositions contemplated within the present invention; it is merely a matter of mixing the desired quantity of di-isopropylamine with the material to be stabilized.

Hereinafter, examples are included indicating the degree of stabilization effected over a period of several months by the stabilizer of the invention, particularly as reflected by materials subject to corrosion by impurities contained in the composition.

In all of the exemplary material, the procedure involved is the disposition of a suitable quantity of stabilized material in a glass container, the partial immersion therein of freshly buffed and polished steel strip measuring about one inch by six inches, the strip being half immersed and half extending above the liquid where it is contacted by vapors from the liquid, and continual exposure to daylight conditions.

EXAMPLE I

For this example, four separate samples, as follows, are prepared from a crude ethylene dichloride stock having been subjected to neutralization and drying as described herein.

Sample No. 1 is a control sample containing substantially no corrosive impurities and no added stabilizer. Sample No. 2 is a stabilized sample of the same stock material containing 0.005 percent by weight di-isopropylamine. Sample No. 3 is a stabilized sample of the same stock material containing 0.01 percent by weight of di-isopropylamine. Sample No. 4 is a stabilized sample of the same stock material containing 0.05 percent by weight of di-isopropylamine.

These samples were exposed, as described above, to storage simulating conditions with the following results:

*Appearance of strip*

| Sample No. | At 20 Days | At 46 Days | At 84 Days | At 207 Days |
|---|---|---|---|---|
| 1 | Slightly rusty in liquid and vapor. | More rusty | More rusty | More rusty. |
| 2 | Clean | Slightly rusty | Slight rust with rust spots in vapor section. | Dark in liquid and rust spots throughout. |
| 3 | do | Clean, slight dulling | Slight rust band at interphase. | Do. |
| 4 | do | Clean and bright in vapor and liquid. | Clean and bright in liquid and vapor. | Clean and bright, slight darkening at interphase. |

While it is not likely that under normal conditions material will require stabilization for as long as 207 days, this table reflects the very great effectiveness of di-isopropylamine. Note that only slight rustiness occurs in sample No. 2 containing only 0.005 percent di-isopropylamine even after 84 days. This period of time is a relatively long and unlikely storage period.

EXAMPLE II

In this example, crude ethylene dichloride, subjected to a light end and hydrogen chloride stripping operation as described herein, is employed. As will be recalled, this is an unneutralized stock. This crude stock is divided into two samples treated as follows:

Sample No. 1 is an ethylene dichloride sample used as a control.

Sample No. 2 is an ethylene dichloride sample to which has been added 0.05 percent by weight of di-isopropylamine.

Observation over a period of 126 days reveals rapid rusting of the control sample and increasing acidity to about 0.00300 at the end of 126 days. The steel strip becomes quite rusty in both vapor and the liquid with rust blisters in the liquid. Sample No. 2 remains bright for an extended period with no rusting; however, finally rustiness begins in the liquid and slight rusting begins in the portion exposed to the vapor. Final acidity in this sample is only 0.00045. Thus, sample No. 2 is less acid by a factor of approximately seven. This example reveals the effectiveness of di-isopropylamine in stabilizing crude, stripped but unneutralized ethylene dichloride. While the effectiveness of the stabilizer may not be demonstrated as clearly in the environment of this example as in that of the first, it is revealed that such unneutralized crude material may be stabilized in accordance with the present invention very satisfactorily for a period of approximately 60 days, which period is perhaps longer than normally would be the case.

From Example II it will be appreciated that a greater quantity of di-isopropylamine should be employed where the storage conditions or the conditions of use of the material would be more unfavorable.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A composition of matter comprising a saturated lower aliphatic chlorohydrocarbon and, as a stabilizer therefor, stabilizing amounts of di-isopropylamine.

2. A composition of matter as claimed in claim 1 wherein the said stabilizing amount is within the range of about 0.005 to about 0.10 percent by weight of the said chlorohydrocarbon.

3. A composition of matter as claimed in claim 1 wherein the said stabilizing amount is within the range of about 0.01 to about 0.05 percent by weight of the said chlorohydrocarbon.

4. A composition of matter comprising ethylene dichloride and, as a stabilizer therefor, stabilizing amounts of di-isopropylamine.

5. A composition of matter as claimed in claim 4 wherein said stabilizing amount is within the range of about 0.005 to about 0.10 percent by weight of said ethylene dichloride.

6. A composition of matter as claimed in claim 4 wherein said stabilizing amount is within the range of about 0.01 to about 0.05 percent by weight of said ethylene dichloride.

References Cited in the file of this patent

UNITED STATES PATENTS

| 1,925,602 | Pitman | Sept. 5, 1933 |

FOREIGN PATENTS

| 391,156 | Great Britain | Apr. 18, 1933 |
| 627,930 | Great Britain | Aug. 9, 1947 |

UNITED STATES PATENT OFFICE

CERTIFICATE OF CORRECTION

Patent No. 2,903,488 September 8, 1959

Norman L. Beckers

It is hereby certified that error appears in the printed specification of the above numbered patent requiring correction and that the said Letters Patent should read as corrected below.

Column 2, line 20, for "is wrought" read -- may be wrought --; column 4, line 39, for "0.10-0.05 percent" read -- 0.01-0.05 percent --.

Signed and sealed this 29th day of March 1960.

(SEAL)
Attest:

KARL H. AXLINE
Attesting Officer

ROBERT C. WATSON
Commissioner of Patents